(12) United States Patent
Cai et al.

(10) Patent No.: US 12,223,645 B2
(45) Date of Patent: Feb. 11, 2025

(54) METHOD AND DEVICE FOR IDENTIFYING ABNORMAL CELL IN TO-BE-DETECTED SAMPLE, AND STORAGE MEDIUM

(71) Applicant: TENCENT TECHNOLOGY (SHENZHEN) COMPANY LIMITED, Shenzhen (CN)

(72) Inventors: De Cai, Shenzhen (CN); Hu Ye, Shenzhen (CN); Zhaoxuan Ma, Shenzhen (CN); Xiao Han, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 399 days.

(21) Appl. No.: 17/701,910

(22) Filed: Mar. 23, 2022

(65) Prior Publication Data
US 2022/0215548 A1    Jul. 7, 2022

Related U.S. Application Data

(63) Continuation of application No. PCT/CN2021/085885, filed on Apr. 8, 2021.

(30) Foreign Application Priority Data

May 9, 2020   (CN) .......................... 202010386000.5

(51) Int. Cl.
*G06T 7/00*      (2017.01)
*G06T 7/11*      (2017.01)
*G06V 10/80*     (2022.01)

(52) U.S. Cl.
CPC .............. *G06T 7/0012* (2013.01); *G06T 7/11* (2017.01); *G06V 10/809* (2022.01); *G06T 2207/30024* (2013.01); *G06T 2207/30242* (2013.01)

(58) Field of Classification Search
CPC .................... G06T 7/0012; G06T 7/11; G06T 2207/30024; G06T 2207/30242;
(Continued)

(56) References Cited

U.S. PATENT DOCUMENTS

2017/0255832 A1    9/2017   Jones et al.

FOREIGN PATENT DOCUMENTS

CN      103827889 A      5/2014
CN      106780466 A      5/2017
(Continued)

OTHER PUBLICATIONS

Phoulady, H.A., Goldgof, D., Hall, L.O. and Mouton, P.R., 2017. A framework for nucleus and overlapping cytoplasm segmentation in cervical cytology extended depth of field and volume images. Computerized Medical Imaging and Graphics, 59, pp. 38-49.*

(Continued)

*Primary Examiner* — Zhitong Chen
(74) *Attorney, Agent, or Firm* — Banner & Witcoff, Ltd.

(57) ABSTRACT

Methods, apparatus, device, and storage medium for identifying an abnormal cell in a to-be-detected sample are disclosed. The method includes obtaining, by a device, multi-layer images of a to-be-detected sample, the to-be-detected sample comprising a single cell and a cell cluster; obtaining, by the device, multi-layer image blocks of the single cell and multi-layer image blocks of the cell cluster according to the multi-layer images; obtaining, by the device, a first identification result by a first image identification network according to the multi-layer image blocks of the single cell; obtaining, by the device, a second identification result by a second image identification network according to the multi-layer image blocks of the cell cluster; and determining, by the device, whether an abnormal cell (Continued)

exists in the to-be-detected sample according to the first identification result and the second identification result.

20 Claims, 8 Drawing Sheets

(58) Field of Classification Search
CPC . G06T 2207/10012; G06T 2207/10056; G06T 2207/30096; G06V 10/809; G06V 20/698; G06N 3/045
See application file for complete search history.

(56) References Cited

FOREIGN PATENT DOCUMENTS

| | | | | |
|---|---|---|---|---|
| CN | 106991673 | A | 7/2017 | |
| CN | 108389198 | A * | 8/2018 | ............... G06T 7/00 |
| CN | 109034208 | A | 12/2018 | |
| CN | 109190567 | A | 1/2019 | |
| CN | 111524132 | A | 8/2020 | |

OTHER PUBLICATIONS

Bora, K., Chowdhury, M., Mahanta, L.B., Kundu, M.K. and Das, A.K., 2017. Automated classification of Pap smear images to detect cervical dysplasia. Computer methods and programs in biomedicine, 138, pp. 31-47.*

Second Chinese Office Action with English concise explanation of relevance regarding CN202010386000.5 dated Jul. 15, 2022.

Ning et al., "Method of Distinguishing Stability of Carotid Plaque Based on Two-stream Neural Network," China Academic Journal Electronic Publishing House, China, May 5, 2019, 7 pages.

International Search Repert with English translation and Written Opinion regarding PCT /CN2021/085885 dated Jul. 8, 2021, 10 pages.

Xu Chuanyun, "Research on Automated Cervical Cytological Smears Interpretation Method," A Thesis Submitted to Chongqing University in Partial Fulfillment ofthe Requirement for the Doctor's Degree of Engineering China Academic Journal Electronic Publishing House, Chongqing University, Chongqing, China, 2014, 148 pages.

Chinese Office Action with English concise explanation of relevance regarding CN202010386000.5 dated Apr. 26, 2022, 9 pages.

* cited by examiner

600

601 Obtain multi-layer images of a to-be-detected sample, the to-be-detected sample including a single cell and a cell cluster

602 Divide the multi-layer images into a plurality of multi-layer image blocks

603 Classify the plurality of multi-layer image blocks into multi-layer image blocks of the single cell and multi-layer image blocks of the cell cluster

604 Input the multi-layer image blocks of the single cell into a first image identification network to obtain a first identification result corresponding to the multi-layer image blocks of the single cell

605 Input the multi-layer image blocks of the cell cluster into a second image identification network to obtain a second identification result corresponding to the multi-layer image blocks of the cell cluster

606 Determine whether an abnormal cell exists in the to-be-detected sample according to the first identification result and the second identification result

FIG. 6

METHOD AND DEVICE FOR IDENTIFYING ABNORMAL CELL IN TO-BE-DETECTED SAMPLE, AND STORAGE MEDIUM

RELATED APPLICATION

The present disclosure is a continuation application of PCT Patent Application No. PCT/CN2021/085885, filed on Apr. 8, 2021, which claims priority to Chinese Patent Application No. 202010386000.5, filed with the China National Intellectual Property Administration on May 9, 2020, both of which are incorporated herein by reference in their entireties.

FIELD OF THE TECHNOLOGY

The present disclosure relates to the field of cell image processing, and in particular, to a technology for detecting abnormal cells in a sample.

BACKGROUND OF THE DISCLOSURE

Cervical cancer is one of the most common malignant tumors in gynecology, and the morbidity and mortality of cervical cancer rank second among female malignant tumors. The key to the prevention and control of cervical cancer is to detect and block the disease process at the precancerous stage. Therefore, the screening work before cervical carcinogenesis is particularly important.

At present, the main effective method for detecting cervical cancer is cervical cell smear examination. First, the sampling doctor prepares a cervical cell smear, and the analyst then uses a detecting device such as a microscope or a digital slice scanner to observe the cells to see if there is any abnormal single cell or cell cluster and determine the category of the abnormal single cell or cell cluster. During screening of cervical cancer, the analyst often needs to fine-tune a thin microscope spiral up and down to view images at different layers, and fully observe the three-dimensional structure of the single cell or the cell cluster to determine an abnormal cell identification result.

In the current abnormal cell identification method, human errors caused by the inexperience of analysts, the energy-consuming manual adjustment of the detecting device, visual fatigue under high-intensity work, and the like result in low reading efficiency and difficult determining process, which affects the accuracy of an abnormal cell identification result.

SUMMARY

In view of this, it is necessary to provide a method and device for identifying an abnormal cell in a to-be-detected sample, and a storage medium. The embodiments of the present disclosure at least resolve some of the problems. Through the technologies of the present disclosure, images at different layers are made full use to separately process a single cell and a cell cluster and classifying and identifying the single cell or the cell cluster. Multi-layer images can display three-dimensional structure information of a cervical cell more fully and comprehensively. Therefore, the multi-layer cell image identification method provided by the present disclosure can more accurately identify the category of a to-be-detected sample (including the cell or the cell cluster), and providing improvement of the image processing technology, particularly in the field of medical image processing and diagnosis.

The present disclosure describes a method for identifying an abnormal cell in a to-be-detected sample. The method includes obtaining, by a device, multi-layer images of a to-be-detected sample, the to-be-detected sample comprising a single cell and a cell cluster. The device includes a memory storing instructions and a processor in communication with the memory. The method also includes obtaining, by the device, multi-layer image blocks of the single cell and multi-layer image blocks of the cell cluster according to the multi-layer images; obtaining, by the device, a first identification result by a first image identification network according to the multi-layer image blocks of the single cell; obtaining, by the device, a second identification result by a second image identification network according to the multi-layer image blocks of the cell cluster; and determining, by the device, whether an abnormal cell exists in the to-be-detected sample according to the first identification result and the second identification result.

The present disclosure describes an apparatus for identifying an abnormal cell in a to-be-detected sample. The apparatus comprising a memory storing instructions; and a processor in communication with the memory. When the processor executes the instructions, the processor is configured to cause the apparatus to perform: obtaining multi-layer images of a to-be-detected sample, the to-be-detected sample comprising a single cell and a cell cluster, obtaining multi-layer image blocks of the single cell and multi-layer image blocks of the cell cluster according to the multi-layer images, obtaining a first identification result by a first image identification network according to the multi-layer image blocks of the single cell, obtaining a second identification result by a second image identification network according to the multi-layer image blocks of the cell cluster, and determining whether an abnormal cell exists in the to-be-detected sample according to the first identification result and the second identification result.

The present disclosure describes a non-transitory computer-readable storage medium, storing computer-readable instructions. The computer-readable instructions, when executed by a processor, are configured to cause the processor to perform: obtaining multi-layer images of a to-be-detected sample, the to-be-detected sample comprising a single cell and a cell cluster; obtaining multi-layer image blocks of the single cell and multi-layer image blocks of the cell cluster according to the multi-layer images; obtaining a first identification result by a first image identification network according to the multi-layer image blocks of the single cell; obtaining a second identification result by a second image identification network according to the multi-layer image blocks of the cell cluster; and determining whether an abnormal cell exists in the to-be-detected sample according to the first identification result and the second identification result.

According to another aspect of the present disclosure, a method for identifying an abnormal cell in a to-be-detected sample is provided. The method may be performed by a processor, and the processor may be specifically a processor in a server or a processor in a terminal. The method includes: obtaining multi-layer images of a to-be-detected sample, the to-be-detected sample including a single cell and a cell cluster; obtaining multi-layer image blocks of the single cell and multi-layer image blocks of the cell cluster according to the multi-layer images; inputting the multi-layer image blocks of the single cell into a first image identification network to obtain a first identification result, and inputting the multi-layer image blocks of the cell cluster into a second image identification network to obtain a second identification result; and determining whether an abnormal cell exists in the to-be-detected sample according to the first identification result and the second identification result.

In some embodiments, the obtaining multi-layer images of a to-be-detected sample includes: obtaining the multi-layer images that are at different depths and include the to-be-detected sample.

In some embodiments, the obtaining multi-layer image blocks of the single cell and multi-layer image blocks of the cell cluster according to the multi-layer images includes: dividing the multi-layer images into a plurality of multi-layer image blocks; and classifying the plurality of multi-layer image blocks into the multi-layer image blocks of the single cell and/or the multi-layer image blocks of the cell cluster.

In some embodiments, the classifying the plurality of multi-layer image blocks into the multi-layer image blocks of the single cell and the multi-layer image blocks of the cell cluster includes: performing the classification by determining a quantity of cell nuclei in each of the plurality of multi-layer image blocks.

In some embodiments, the inputting the multi-layer image blocks of the single cell into a first image identification network to obtain a first identification result includes: selecting at least one layer of image blocks from the multi-layer image blocks of the single cell, and inputting the at least one layer of image blocks into a first part of the first image identification network to obtain a first single-layer identification result corresponding to the multi-layer image blocks of the single cell; inputting the multi-layer image blocks of the single cell into a second part of the first image identification network to obtain a first multi-layer identification result corresponding to the multi-layer image blocks of the single cell; and fusing the first single-layer identification result and the first multi-layer identification result to obtain the first identification result, where the first part of the first image identification network is used for extracting plane information of the single cell, and the second part of the first image identification network is used for extracting three-dimensional structure information of the single cell.

In some embodiments, the fusing the first single-layer identification result and the first multi-layer identification result to obtain the first identification result includes: performing weighted averaging on the first single-layer identification result and the first multi-layer identification result for a plurality of abnormal cell types of the single cell, to obtain the first identification result.

In some embodiments, the inputting the multi-layer image blocks of the cell cluster into a second image identification network to obtain a second identification result includes: selecting at least one layer of image blocks from the multi-layer image blocks of the cell cluster, and inputting the at least one layer of image blocks into a first part of the second image identification network to obtain a second single-layer identification result corresponding to the multi-layer image blocks of the cell cluster; inputting the multi-layer image blocks of the cell cluster into a second part of the second image identification network to obtain a second multi-layer identification result corresponding to the multi-layer image blocks of the cell cluster; and fusing the second single-layer identification result and the second multi-layer identification result to obtain the second identification result, where the first part of the second image identification network is used for extracting plane information of the cell cluster, and the second part of the second image identification network is used for extracting three-dimensional structure information of the cell cluster.

In some embodiments, the fusing the second single-layer identification result and the second multi-layer identification result to obtain the second identification result includes: performing weighted averaging on the second single-layer identification result and the second multi-layer identification result for a plurality of abnormal cell types of the cell cluster, to obtain the second identification result.

In some embodiments, the first image identification network and the second image identification network are both image identification networks for processing three-dimensional vectors.

In some embodiments, the first image identification network is trained based on a first data set, and the first data set includes multi-layer images of the single cell and labels of abnormal cell types of the multi-layer images of the single cell; and the second image identification network is trained based on a second data set, and the second data set includes multi-layer images of the cell cluster and labels of abnormal cell types of the multi-layer images of the cell cluster.

In some embodiments, the first identification result indicates an abnormal cell type in the multi-layer image blocks of the single cell, the second identification result indicates an abnormal cell type in the multi-layer image blocks of the cell cluster. The method further includes: determining an abnormal cell type in the to-be-detected sample according to the first identification result and the second identification result.

In some embodiments, the to-be-detected sample includes a cervical cell smear.

According to another aspect of the present disclosure, a device for identifying an abnormal cell in a to-be-detected sample is provided. The device includes: an obtaining module, configured to obtain multi-layer images of a to-be-detected sample, the to-be-detected sample including a single cell and a cell cluster; a pre-processing module, configured to obtain multi-layer image blocks of the single cell and multi-layer image blocks of the cell cluster according to the multi-layer images; a first identification module, configured to input the multi-layer image blocks of the single cell into a first image identification network to obtain a first identification result; a second identification module, configured to input the multi-layer image blocks of the cell cluster into a second image identification network to obtain a second identification result; and a determining module, configured to determine whether an abnormal cell exists in the to-be-detected sample according to the first identification result and the second identification result.

According to another aspect of the present disclosure, an identification device for an abnormal cell in a to-be-detected sample is further provided, including: a memory, configured to store computer executable instructions; and a processor, configured to perform, when the computer executable instructions are executed by the processor, steps of the method for identifying an abnormal cell in a to-be-detected sample provided according to the foregoing aspect.

In some embodiments, the device further includes: a user interface, configured to display an identification result of an abnormal cell.

In some embodiments, the device further includes: a network interface, configured to transmit an identification result of an abnormal cell.

In some embodiments, the device further includes: a network interface, configured to receive at least one of the following pieces of data: multi-layer images of a to-be-detected sample, a first data set, or a second data set.

According to another aspect of the present disclosure, a computer device is provided, including a memory and a processor, the memory storing a computer program, the computer program, when executed by the processor, causing the processor to perform steps of the method for identifying an abnormal cell in a to-be-detected sample provided according to the foregoing aspect.

According to another aspect of the present disclosure, a computer-readable storage medium is provided, storing a computer program, the computer program, when executed by a processor, causing the processor to perform steps of the method for identifying an abnormal cell in a to-be-detected sample provided according to the foregoing aspect.

According to another aspect of the present disclosure, a computer program product is provided, including instructions, the instructions, when run on a computer, causing the computer to perform steps of the method for identifying an abnormal cell in a to-be-detected sample provided according to the foregoing aspect.

According to the method for identifying an abnormal cell in a to-be-detected sample claimed in the present disclosure, the single-layer image and the multi-layer images of the cell are inputted into a multi-layer image identification network, and abnormal cell identification is performed on the to-be-detected sample by using the artificial intelligence-based multi-layer image identification network, to obtain a corresponding identification result. The method makes full use of the depth, shape and other information of the cell, and effectively utilizes rich three-dimensional structure information of the corresponding cell included in the multi-layer images, so as to identify an abnormal cell more accurately. Through the method and device for identifying an abnormal cell in a cell smear claimed in the present disclosure, automatic abnormal cell analysis of a sampled cell based on the three-dimensional structure of the cell is implemented, which saves analysis resources and the energy of analysts. The method and the device reduce the error of analysis by analysts and make the identification result more accurate. Therefore, the method and the device implement high-speed and high-precision abnormal cell identification.

According to the embodiments described below, such and other aspects of the present disclosure are clear and comprehensible, and are described with reference to the embodiments described below.

BRIEF DESCRIPTION OF THE DRAWINGS

In the following description of exemplary embodiments with reference to the accompanying drawings, more details, features, and advantages of the present disclosure are disclosed. In the accompanying drawings:

FIG. 6 is a schematic exemplary flowchart of applying a method for identifying an abnormal cell in a to-be-detected sample according to another embodiment of the present disclosure.

DESCRIPTION OF EMBODIMENTS

Figure 1:
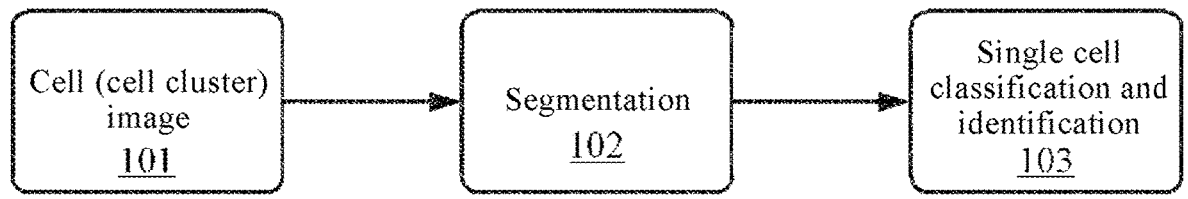
FIG. 1 is a schematic diagram of a method for identifying an abnormal cell in a to-be-detected sample in the related art.

Before the embodiments of the present disclosure are described in detail, some related concepts are explained first.

Artificial intelligence (AI) is a theory, method, technology, and application system in which a digital computer or a machine controlled by a digital computer is used for simulating, extending, and expanding human intelligence, sensing an environment, acquiring knowledge, and using the knowledge to obtain an optimal result. In other words, AI is a comprehensive technology of computer science, which attempts to understand essence of intelligence and produces a new intelligent machine that can respond in a manner similar to human intelligence. With the research and progress of AI technologies, the AI technology has been researched and applied to many fields, such as a common smart home, a smart wearable device, a virtual assistant, a smart speaker, smart marketing, unmanned driving, automatic driving, an unmanned aerial vehicle, a robot, smart medical care, smart customer service, and the like. Intelligent microscopes developed in recent years have been proven to be effective in improving work efficiency of analysts and the accuracy and consistency of pathology analysis in tests, which helps to resolve the problem of a shortage and inexperience of analysts. During use of an AI microscope, the intelligent microscope presents an analysis result in the field of view of the microscope in real time and accurately, and the operation is very simple. The intelligent microscope can automatically and efficiently count the quantity of cells, area, and other information in real time. The intelligent microscope is precise and stable, thereby avoiding differences in interpretations by different doctors. In addition, it is user-friendly because analysis results are directly fed back to an eyepiece without interfering with reading and recording of analysts.

A convolutional neural network (CNN), as one of the specific implementation tools of artificial intelligence, is a depth model that can directly act on original inputs, thereby automating a feature construction process. The convolutional neural network plays an excellent role in image classification and object detection, and a deep multi-parameter network can extract detailed features from images. Conventional convolutional neural networks only extract depth features from a single frame, ignoring three-dimensional structure information of an object, while a cell is a regularly changing hierarchical model in the hierarchical order, and hierarchical features of the cell include important information about the depth of the cell. Therefore, it is difficult to effectively complete a cognitive process of the three-dimensional structure of the cell by using a conventional convolutional neural network model.

A two-stream convolutional neural network is a neural network architecture based on two separate identification streams and combining the two separate identification streams through post fusion. Specifically, the two-stream convolutional neural network may be used for performing action identification in videos. In this case, the two separate identification streams are a spatial stream and a temporal stream. The spatial stream performs action recognition according to still video frames, while the temporal stream is trained to recognize actions according to movements in the form of dense optical flows. In the present disclosure, the two-stream convolutional neural network is used for identifying an abnormal cell from cells (cell clusters). In this case, the two separate identification streams are respectively a spatial stream and a hierarchical stream. The spatial stream extracts plane information according to a single-layer cell (cell cluster) image. The hierarchical stream extracts three-dimensional structure (for example, depth) information of a cell (cell cluster) according to multi-layer cell (cell cluster) images, and provides richer depth information by analyzing features of the images in the hierarchical order, so that the hierarchical stream and the spatial stream complement each other to effectively completing three-dimensional structure information of an object in the images.

Figure 2:
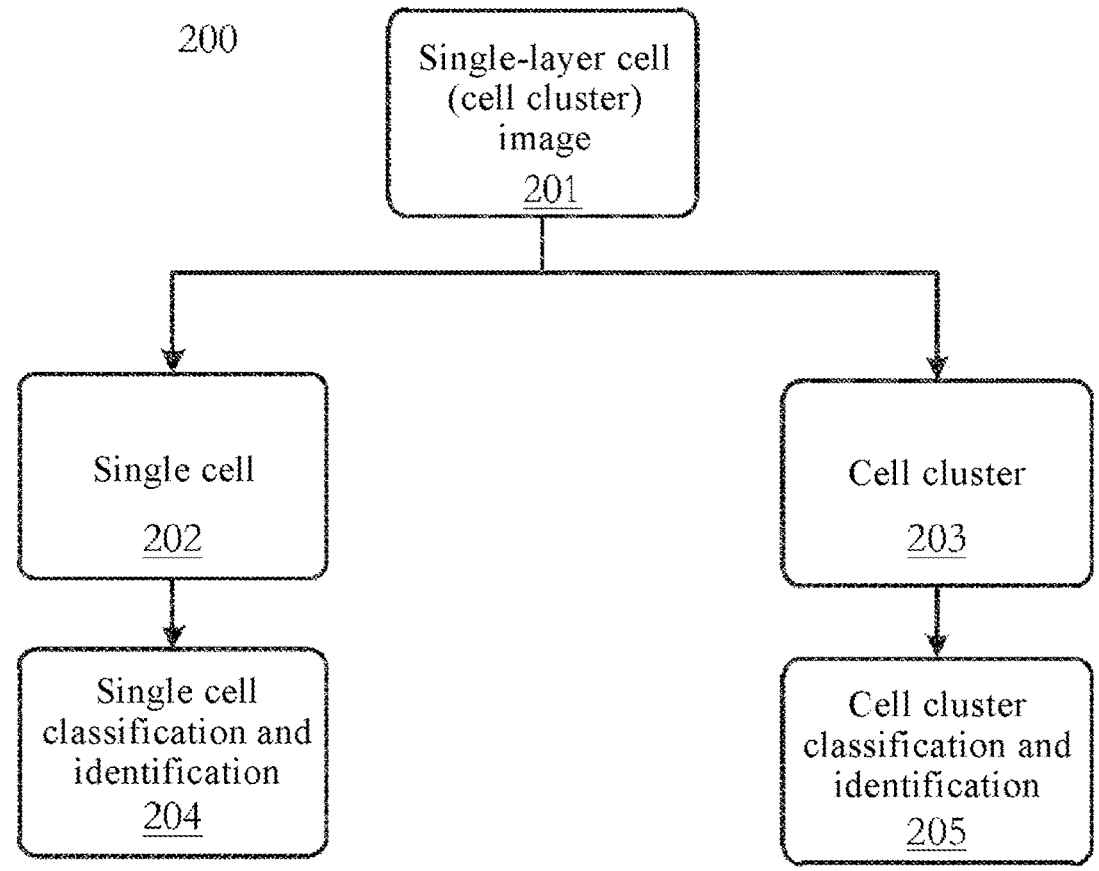
FIG. 2 is a schematic diagram of another method for identifying an abnormal cell in a to-be-detected sample in the related art.

Recently, a method for identifying an abnormal cell in a to-be-detected sample by using artificial intelligence technologies is further provided. One method for identifying an abnormal cell is a method 100 for identifying an abnormal cell in a to-be-detected sample as shown in FIG. 1. In the method 100, an image 101 of cells or cell clusters is segmented to obtain a single cell in step 102, and abnormal cell classification and identification is then performed on the single cell in step 103, thereby obtaining an abnormal cell identification result of a to-be-detected sample. Another method for identifying an abnormal cell is a method 200 for identifying an abnormal cell in a to-be-detected sample as shown in FIG. 2. In the method 200, an image 201 of a single layer of cells or cell clusters are classified to obtain a single cell 202 and a cell cluster 203, and classification and identification are then performed on the single cell in step 204 and on the cell cluster in step 205. Finally, an abnormal cell identification result of a to-be-detected sample is obtained based on a result of single cell classification and identification and a result of cell cluster classification and identification.

Figure 3:
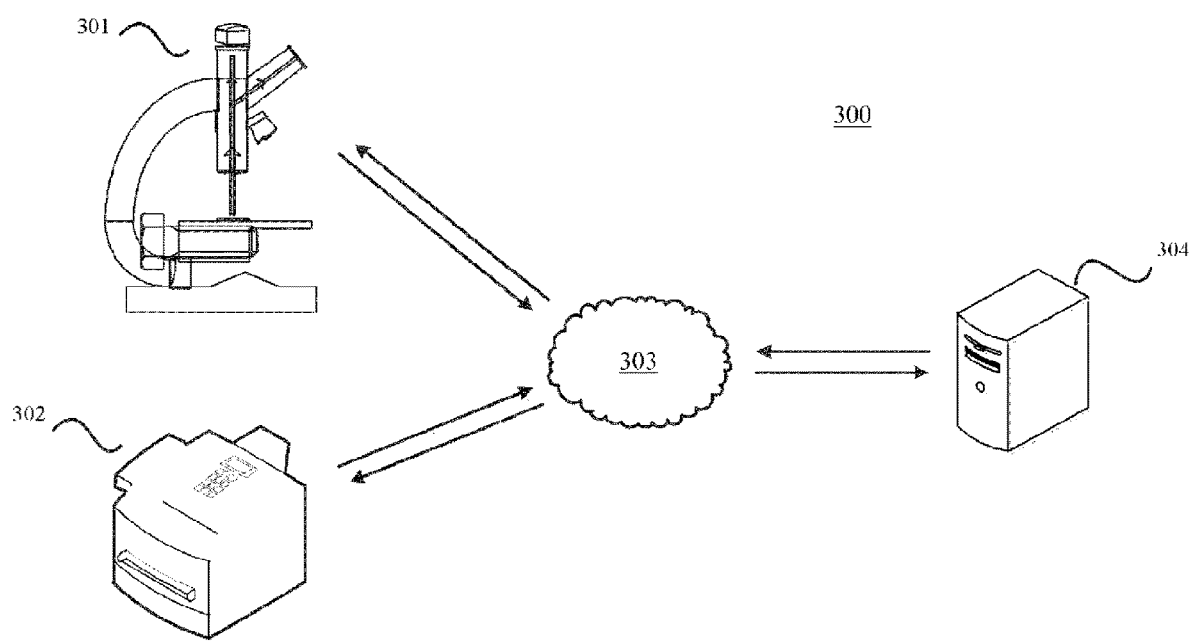
FIG. 3 schematically shows an example scenario of applying a method for identifying an abnormal cell in a to-be-detected sample according to an embodiment of the present disclosure.

There are at least the following problems in the current methods for identifying an abnormal cell in a to-be-detected sample. In the method 100, it is not easy to segment a single cell from the cells especially the cell clusters in step 102, because cytoplasms and even nuclei of the cells in many cell clusters overlap each other. Conventional segmentation methods and neural network-based segmentation methods have poor effect on segmenting the cell clusters. On the other hand, the arrangement of cells in some cell clusters is important in interpreting types of the cell clusters. However, after the cells (cell clusters) are segmented in step 102 to obtain a single cell, such arrangement information is lost during classification of the single cell. In the method 200, the single cell and the cell cluster are separately processed, but only single-layer image information of the single cell and the cell cluster is utilized in step 201. However, the single cell or the cell cluster has a three-dimensional structure, and information presented by a single-layer image is two-dimensional information with very limited content. In addition, cell clusters of different abnormal categories may have similar morphologies at some levels, and the identification of an abnormal cell only through a single-layer image is likely to confuse identification results of cell clusters of different pathological categories, which reduces the accuracy of identifying the abnormal cell. It can be seen that single-layer image information is insufficient to perform abnormal cell identification on the single cell especially the cell cluster FIG. 3 schematically shows an example scenario 300 of applying a method for identifying an abnormal cell in a to-be-detected sample according to an embodiment of the present disclosure. The application scenario 300 may include a microscope 301 (the specific structure of which will be described in detail in FIG. 4), a digital slice scanner 302, a network 303, and a server 304. This embodiment of this application is described by using an example in which the method for identifying an abnormal cell in a to-be-detected sample is performed by the server 304 (for example, a processor in the server 304). At present, images are mainly obtained by using the microscope 301 or the digital slice scanner 302 in cervical cancer screening, and analysts then screen and identify categories of positive (abnormal) cells or positive (abnormal) cell clusters. The method for multi-layer identification of a cell (cell cluster) in the present disclosure can be applied to both the microscope 301 and the digital slice scanner 302. The microscope 301 and the digital slice scanner 302 are configured to obtain multi-layer images of a to-be-detected sample. The application scenario 300 includes either or both of the microscope 301 and the digital slice scanner 302.

The application scenario 300 may further include another suitable apparatus for obtaining multi-layer images of the to-be-detected sample.

In the present disclosure, the multi-layer images of the to-be-detected sample are obtained by using the microscope 301 and/or the digital slice scanner 302 first and then transmitted to the server 304 by using the network 303. The network 303 may include a wired network (for example, a local area network (LAN) or a cable) and a wireless network (for example, a wireless local area network (WLAN), a cellular network, or a satellite network). The server 304 stores at least a pre-trained multi-layer image identification network (for example, a two-stream convolutional neural network or another neural network for processing three-dimensional vectors), and performs abnormal cell identification on the received multi-layer images by using the multi-layer image identification network, to obtain an identification result. Next, the server 304 transmits the identification result to the microscope 301 and/or the digital slice scanner 302 by using the network 303 via the network interface. The microscope 301 and the digital slice scanner 302 may have respective display interfaces, so that analysts can conveniently view an abnormal cell analysis result. For example, the analysis result may be directly fed back to an eyepiece of the microscope 301. The abnormal cell identification based on the multi-layer image identification network may be performed on the server 304 or directly performed on the microscope 301 and/or the digital slice scanner 302 (in a case that the microscope 301 and/or the digital slice scanner 302 each include a processor).

Figure 4:
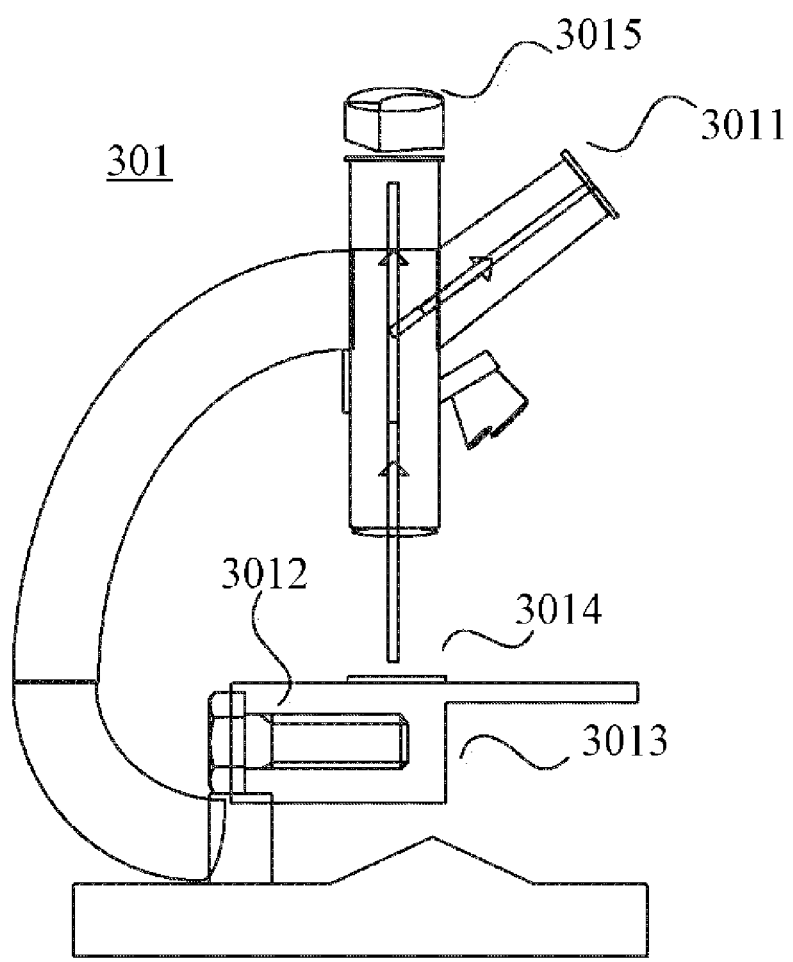
FIG. 4 schematically shows an intelligent microscope of applying a method for identifying an abnormal cell in a to-be-detected sample according to an embodiment of the present disclosure.

FIG. 4 schematically shows the microscope 301 of applying a method for identifying an abnormal cell in a to-be-detected sample according to an embodiment of the present disclosure. As shown in FIG. 4, the microscope 301 includes an eyepiece 3011, a thick/thin spiral 3012, a lifting table 3013, a cell smear 3014 placed on an object stage, and an image acquisition device 3015.

For example, an analyst may use the microscope 301 to observe the cell smear 3014, observes an image of corresponding cell tissue (a single cell or a cell cluster) on the cell smear 3014 through the eyepiece 3011 of the microscope 301, and adjusts the thick/thin spiral 3012 and the lifting table 3013 to adjust the focus of the eyepiece, so as to adjust the position, angle, layer, and sharpness of the observed image. After determining the image of the corresponding cell tissue (the single cell or the cell cluster) to be analyzed, the analyst can acquire multi-layer images of the determined image of the cell tissue (the single cell or the cell cluster) by using the image acquisition device 3015, and automatically or manually select one of the images as a single-layer image (preferably, a relatively clear image is selected from the images as the single-layer image). Next, the microscope 301 transmits the selected single-layer image and all the plurality of multi-layer images to the server for abnormal cell analysis to obtain an abnormal cell analysis result. In a case that the microscope 301 receives the abnormal cell analysis result from the server, the abnormal cell analysis result is displayed on a display interface (not shown, for example, the field of view of the eyepiece of the microscope 301) configured on the microscope 301 or superimposed on a digital image obtained by the microscope 301 for reference and use by the analyst. In some embodiments in the present disclosure, a single cell may be referred to an isolated cell that is not part of a cell cluster. In some other embodiments in the present disclosure, a single cell may be a cell in a cell cluster and be a part of the cell cluster.

The abnormal cell identification function may be implemented by a processor of the microscope 301 (in a case that the microscope 301 has processing capability), or the microscope 301 may transmit acquired data (the selected single-layer image and all the plurality of multi-layer images) to another network device (for example, the server 304 in FIG. 3) for implementing the function.

Alternatively, the analyst may perform image acquisition by using the digital slice scanner 302 other than the microscope 301. The digital slice scanner 302 can scan and image an entire slice. Generally, considering the scan speed, only a single layer is scanned. However, during application of the method for identifying an abnormal cell in a to-be-detected sample provided in the present disclosure, the digital slice scanner 302 is set to multi-slice scanning, so that the digital slice scanner 302 can acquire multi-layer images of the image of the determined cell tissue (the single cell or the cell cluster), and one of the images is automatically or manually selected as a single-layer image (preferably, a relatively clear image is selected from the images as the single-layer image). Next, the digital slice scanner 302 transmits the selected single-layer image and all the plurality of multi-layer images to the server for abnormal cell analysis to obtain an abnormal cell analysis result. In a case that the digital slice scanner 302 receives the abnormal cell analysis result from the server, the abnormal cell analysis result is displayed on a display interface (not shown) configured on the digital slice scanner 302 or superimposed on a digital image obtained by the digital slice scanner 302 for reference and use by the analyst.

The abnormal cell identification function may be implemented by a processor of the digital slice scanner 302 (in a case that the digital slice scanner 302 has processing capability), or the digital slice scanner 302 may transmit acquired data (the selected single-layer image and all the plurality of multi-layer images) to another network device (for example, the server 304 in FIG. 3) for implementing the function.

Figure 5:
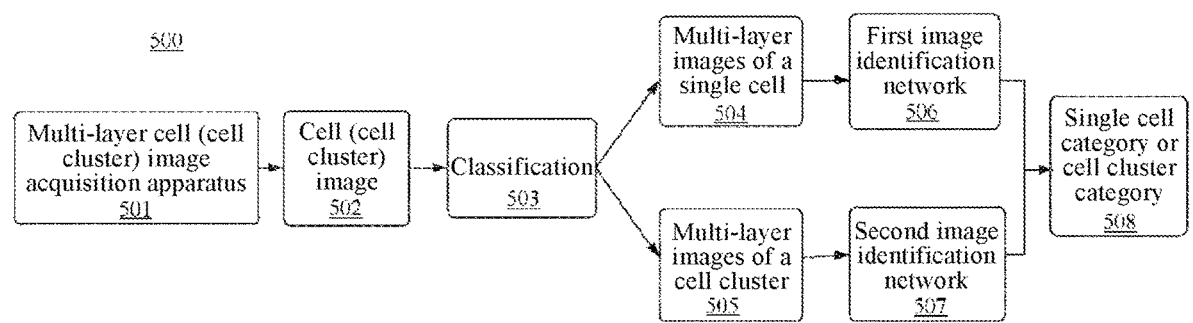
FIG. 5 is a schematic exemplary flowchart of a method for identifying an abnormal cell in a to-be-detected sample according to an embodiment of the present disclosure.

FIG. 5 is a schematic exemplary flowchart of a method 500 for identifying an abnormal cell in a to-be-detected sample according to an embodiment of the present disclosure. The method 500 may be applied to the microscope 301 or the digital slice scanner 302. Images 502 of a multi-layer cell (cell cluster) are obtained by using an image acquisition apparatus 501 (for example, the microscope 301 or the digital slice scanner 302 described above) of the multi-layer cell (cell cluster). Next, in step 503, the images 502 of the multi-layer cell (cell cluster) are classified into multi-layer images 504 of the single cell and multi-layer images 505 of the cell cluster. The multi-layer images 504 of the single cell are inputted into a first image identification network 506 and the multi-layer images 505 of the cell cluster are inputted into a second image identification network 507. In step 508, classification information of the single cell or the cell cluster is jointly determined (for example, determined through merging and deduplication) based on an identified abnormal cell type obtained by the first image identification network 506 and an identified abnormal cell type obtained by the second image identification network 507. The classification information of the cell (the cell cluster) may be displayed on a display interface configured on the microscope 301 (for example, a field of view of an eyepiece of the microscope 301) or a display interface configured on the digital slice scanner 302 to an analyst, or may be superimposed on a digital image obtained by the digital scanner for interpretation by the analyst.

For ease of understanding, the method for identifying an abnormal cell in a to-be-detected sample provided in the embodiments of the present disclosure is described from the perspective of the server 304. FIG. 6 is a schematic exemplary flowchart of a method 600 for identifying an abnormal cell in a to-be-detected sample according to another embodiment of the present disclosure. As shown in FIG. 6, the method 600 includes the following steps:

Step 601: A server 304 obtains multi-layer images of a to-be-detected sample, the to-be-detected sample including a single cell and a cell cluster. For example, in a case that an analyst uses a microscope, the analyst observes a to-be-detected cell smear through an eyepiece of the microscope and determines to-be-analyzed cell tissue within the eyepiece. After determining an image of the to-be-analyzed corresponding cell tissue, the analyst acquires multi-layer images of the determined image of the cell tissue (including the single cell and the cell cluster) by using an image acquisition device (for example, the image acquisition device 3015 in FIG. 3). In some embodiments, the obtaining multi-layer images of a to-be-detected sample includes: obtaining the multi-layer images that are at different depths and include the to-be-detected sample. The multi-layer images obtained herein may be images at different layers viewed by an analyst by fine-tuning a thin microscope spiral up and down in the conventional method.

In some embodiments, after the microscope acquires the multi-layer images of the determined image of the cell tissue (including the single cell and the cell cluster) by using the image acquisition device, the microscope 301 may transmit the multi-layer images to the server 304 by using a network 303, so that the server 304 obtains the multi-layer image of the to-be-detected sample.

Step 602: The server 304 divides the multi-layer images into a plurality of multi-layer image blocks.

In some embodiments, the server 304 de-noises the acquired multi-layer images and removes backgrounds to determine a region in which the cell tissue exists (including the single cell and the cell clusters). The obtained multi-layer images are divided based on a boundary of the determined cell tissue to obtain the plurality of multi-layer image blocks.

Next, the server 304 classifies the plurality of multi-layer image blocks into multi-layer image blocks of the single cell and multi-layer image blocks of the cell cluster.

Step 603: The server 304 classifies the plurality of multi-layer image blocks into multi-layer image blocks of the single cell and multi-layer image blocks of the cell cluster. Because the obtained plurality of multi-layer image blocks may include both the multi-layer image blocks of the single cell and the multi-layer image blocks of the cell cluster, the server 304 may classify the plurality of multi-layer image blocks first. Specifically, the server 304 may perform the classification by determining a quantity of cell nuclei in each of the plurality of multi-layer image blocks. For example, if one of the plurality of multi-layer image blocks includes one cell nucleus, it indicates that the image block includes only a single cell and belongs to the multi-layer image blocks of the single cell. In another example, if another image block in the plurality of multi-layer image blocks includes more than one cell nucleus (for example, six cell nuclei), it indicates that the image block includes a plurality of cells and belongs to the multi-layer image blocks of the cell cluster.

A person skilled in the art may also classify the image blocks by using another classification method, for example, perform classification through a trained neural network to obtain the multi-layer image blocks of the single cell and the multi-layer image blocks of the cell cluster.

Steps 602 to 603 are merely a specific implementation for the server 304 to obtain the multi-layer image blocks of the single cell and the multi-layer image blocks of the cell cluster according to the multi-layer images. In another possible implementation of this embodiment of this application, the server 304 may obtain the multi-layer image blocks of the single cell and the multi-layer image blocks of the cell cluster in another way.

Step 604: The server 304 inputs the multi-layer image blocks of the single cell into a first image identification network to obtain a first identification result. In some implementations, step 604 may include obtaining a first identification result corresponding to the multi-layer image blocks of the single cell by a first image identification network according to the multi-layer image blocks of the single cell. The single cell may include any one of normal columnar cells, normal middle layer cells, normal superficial cells, low-grade squamous intraepithelial lesion cells, moderate squamous intraepithelial lesion cells, severe squamous intraepithelial lesion cells, squamous cell carcinoma cells, and other cervical single cells. Hence, in some implementations, the first identification result may include a set of probabilities of the single cell to be classified as at least one of normal columnar cells, normal middle layer cells, normal superficial cells, low-grade squamous intraepithelial lesion cells, moderate squamous intraepithelial lesion cells, severe squamous intraepithelial lesion cells, squamous cell carcinoma cells, and other cervical single cells. In some other implementations, the first identification result may include a single probability or a single cell type which has the largest probability among the cell types.

The first image identification network is capable of acquiring a three-dimensional structure feature and a plane structure feature of the single cell in the images and interpreting an abnormal cell type based on the acquired three-dimensional structure feature and plane structure feature of the single cell. The server 304 inputs the acquired multi-layer image blocks of the single cell into the first image identification network to obtain the first identification result corresponding to the multi-layer image blocks of the single cell.

In an embodiment, the server 304 selects at least one layer of image blocks from the multi-layer image blocks of the single cell, inputs the at least one layer of image blocks into a first part of the first image identification network to obtain a first single-layer identification result corresponding to the multi-layer image blocks of the single cell, inputs the multi-layer image blocks of the single cell into a second part of the first image identification network to obtain a first multi-layer identification result corresponding to the multi-layer image blocks of the single cell, and then fuses the first single-layer identification result and the first multi-layer identification result to obtain the first identification result. The first part of the first image identification network is used for extracting plane information of the single cell, and the second part of the first image identification network is used for extracting three-dimensional structure information of the single cell. In some implementations, the server 304 may select a single layer of image blocks from the multi-layer image blocks of the single cell, inputs the single layer of image blocks into a first part of the first image identification network to obtain a first single-layer identification result; the server 304 may input the multi-layer image blocks of the single cell into a second part of the first image identification network to obtain a first multi-layer identification result corresponding to the multi-layer image blocks of the single cell; and/or the server 304 may then fuse the first single-layer identification result and the first multi-layer identification result to obtain the first identification result.

In an embodiment, that the server 304 fuses the first single-layer identification result and the first multi-layer identification result to obtain the first identification result includes: the server 304 performs weighted averaging on the first single-layer identification result and the first multi-layer identification result for a plurality of abnormal cell types of the single cell, to obtain the first identification result. In some implementations, the server 304 may performs weighted averaging on the first single-layer identification result and the first multi-layer identification result for a plurality of cell types of the single cell, to obtain the first identification result, wherein the cell types of the single cell may include normal and abnormal cell types.

Figure 7:
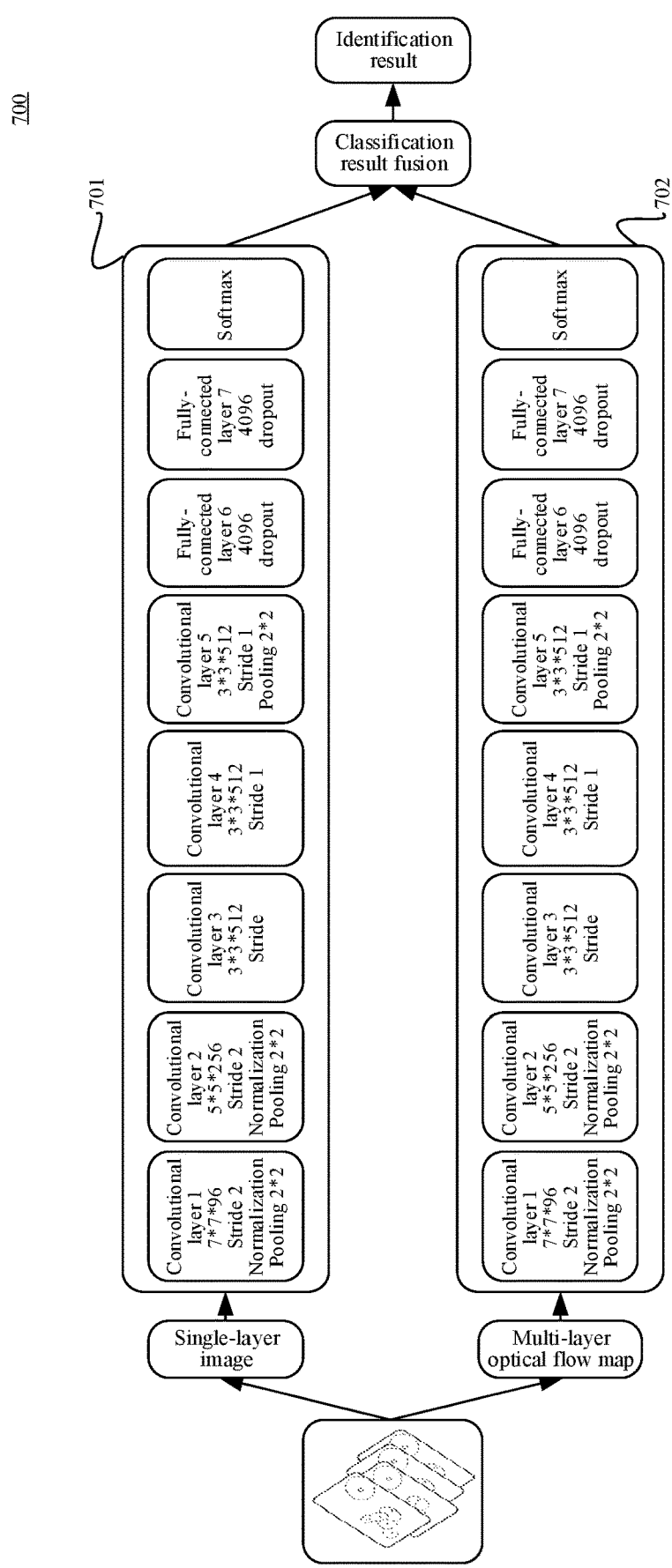
FIG. 7 is a schematic diagram of a multi-layer image identification network according to an embodiment of the present disclosure.

In some embodiments, the first image identification network may be in a structure 700 of a two-stream convolutional neural network as shown in FIG. 7. The first image identification network includes a first part (for example, a first branch 701) of the first image identification network and a second part (for example, a second branch 702) of the first image identification network. The first part of the first image identification network is used for extracting the plane information of the single cell, and the second part of the first image identification network is used for extracting the three-dimensional structure information of the single cell.

In an embodiment, the architecture of the two-stream convolutional neural network may be configured as follows: The first layer is a convolutional layer with a convolution kernel of 7×7×96 (where 7×7 is a size in a spatial dimension, and 96 is a size in a hierarchical dimension), the stride of 2, a pooling kernel of 2×2, and a rectified linear unit (ReLU) function as an activation function, and performs normalization operations. The second layer is a convolutional layer with a convolution kernel of 5×5×256 (where 5×5 is a size in a spatial dimension, and 256 is a size in a hierarchical dimension), the stride of 2, a pooling kernel of 2×2, and a ReLU function as an activation function, and performs normalization operations. The third layer is a convolutional layer with a convolution kernel of 3×3×512 (where 3×3 is a size in a spatial dimension, and 512 is a size in a hierarchical dimension), the stride of 1, and a ReLU function as an activation function. The fourth layer is a convolutional layer with a convolution kernel of 3×3×512 (where 3×3 is a size in a spatial dimension, and 512 is a size in a hierarchical dimension), the stride of 1, and a ReLU function as an activation function. The fifth layer is a convolutional layer with a convolution kernel of 3×3×512 (where 3×3 is a size in a spatial dimension, and 512 is a size in a hierarchical dimension), the stride of 1, a pooling kernel of 2×2, and a ReLU function as an activation function. The sixth layer is a fully-connected layer with 4096 nodes and a ReLU function as an activation function. The seventh layer is a fully-connected layer with 2048 nodes and a ReLU function as an activation function. The eighth layer is a softmax layer.

In a two-stream convolutional neural network of such an architecture, weight and bias parameters of the network are initialized first. In the related art, there are many methods for implementing parameter initialization, and details are not described herein again. Next, the two-stream convolutional neural network is trained. As understood by a person skilled in the art, the server 304 may separately or jointly train the first part (for example, the first branch 701) of the first image identification network and the second part (for example, the second branch 702) of the first image identification network. The server 304 may train the first image identification network in a supervised training manner by using a first data set. The first data set includes multi-layer images of the single cell and labels of abnormal cell types corresponding to the multi-layer images of the single cell. The server 304 inputs input data in available data to corresponding branches (for example, the first branch 701 and the second branch 702) of the two-stream convolutional neural network for performing complete calculations and obtaining output data. Let a performance function of the branches of the two-stream convolutional neural network be a square value of a difference between each obtained piece of output data and the corresponding label, and summation is then performed, to determine the most suitable parameter group by searching for a global minimal point of the performance function.

In some embodiments, the server 304 adopts a back-propagation algorithm to search for the global minimal point in the present disclosure. Further, in the process of determining the most suitable parameter group, the server 304 generalizes the two-stream convolutional neural network by using a generalization method, so as to avoid a phenomenon of overfitting of the parameter group of the network. For example, the available data may be classified into three parts: a training set, a validation set, and a test set, where the training set accounts for 70%, the validation set accounts for 15%, and the test set accounts for 15%. The training set is used for calculating a gradient or a Jacobian matrix and determining the update of a network weight at each reverse iteration. The validation set is an indicator. During training, if the error sum of squares of the validation set continues to increase, training is ended. The test set is used for finally testing whether the use effect of the two-stream convolutional neural network satisfies the effect, that is, whether the error sum of squares of the test set is less than a preset threshold.

In a case that the server 304 uses the trained two-stream convolutional neural network, at least one layer of image blocks are selected from the multi-layer image blocks (for example, a layer of relatively clear image blocks are selected), and the at least one layer of image blocks are inputted into the first part of the first image identification network. In an embodiment, the server 304 selects a layer of image blocks. The layer of image blocks pass through five convolutional layers, are then processed by two fully-connected layers, and finally enter the softmax layer to obtain the first single-layer identification result corresponding to the multi-layer images of the single cell. The server 304 inputs the multi-layer image blocks of the single cell to the second part of the first image identification network. The multi-layer image blocks of the single cell pass through five convolutional layers, are then processed by two fully-connected layers, and finally enter the softmax layer to obtain the first multi-layer identification result corresponding to the single cell.

In an embodiment, the server 304 obtains an optical flow map in advance by using the multi-layer image blocks of the single cell. Such an optical flow map can represent the three-dimensional structure information of the single cell. The optical flow map passes through five convolutional layers, is then processed by two fully-connected layers, and finally enters the softmax layer to obtain the first multi-layer identification result corresponding to the single cell. After the first single-layer identification result and the first multi-layer identification result are obtained, the server 304 fuses the first single-layer identification result and the first multi-layer identification result to obtain the first identification result.

In an embodiment, that the server 304 fuses the first single-layer identification result and the first multi-layer identification result for a plurality of abnormal cell types of the single cell includes: the server 304 performs weighted averaging on the first single-layer identification result and the first multi-layer identification result. Using high-grade squamous intraepithelial lesion (HSIL) as an example of the abnormal cell type of the single cell, if the first single-layer identification result is HSIL 0.7, and the first multi-layer identification result is HSIL 0.3, the first identification result is a weighted average of the first single-layer identification result of HSIL 0.7 and the first multi-layer identification result of HSIL 0.3. For example, if weights of the first single-layer identification result and the first multi-layer identification result are both equal to 0.5, a weighted average result is (0.7+0.3)/2=0.5. The server 304 then compares the weighted average result with a preset threshold. For example, if the preset threshold is 0.4, the server 304 determines that the cell property is HSIL.

The weights of the first single-layer identification result and the first multi-layer identification result may not be equal, and the preset threshold is also adjusted according to situations. Similar weighting calculations may be performed for other abnormal types of the single cell.

In some embodiments, the first image identification network may be another type of image identification network for processing a three-dimensional vector. First, the image identification network performs feature pre-extraction on original multi-layer images in sequence, generates a plurality of pieces of channel information including optical flow information, combines information of all channels to obtain an initial feature map, and uses prior knowledge of initial features to improve the performance of network initialization. Next, the information of the plurality of (for example, five) channels is inputted into a convolutional layer and a downsampling layer of a lower-layer network for further feature extraction. The convolutional layer and the downsampling layer have different widths and scales to ensure that features of the images of the single cell at different scales can be effectively extracted while features of the original multi-layer images are extracted, and make the features of the images of the single cell robust to different motion directions of the single cell. Finally, the features extracted from the layers are combined in the fully-connected layer to obtain a feature vector. The feature vector includes both spatial and hierarchical feature information of the multi-layer images. A stochastic gradient descent (SGD) method is used for training the network in a supervised manner based on a self-constructed multi-layer image dataset, and pathological information of the single cell is interpreted.

Step 605: The server 304 inputs the multi-layer image blocks of the cell cluster into a second image identification network to obtain a second identification result. In some implementations, step 605 may include obtaining a second identification result corresponding to the multi-layer image blocks of the cell cluster by a second image identification network according to the multi-layer image blocks of the cell cluster. The term "cell cluster" may include a combination of at least two of normal columnar cells, normal middle layer cells, normal superficial cells, low-grade squamous intraepithelial lesion cells, moderate squamous intraepithelial lesion cells, severe squamous intraepithelial lesion cells, squamous cell carcinoma cells, and other cervical single cells. Hence, in some implementations, the second identification result may include a set of probabilities of the cell cluster to be classified as a combination of at least two of normal columnar cells, normal middle layer cells, normal superficial cells, low-grade squamous intraepithelial lesion cells, moderate squamous intraepithelial lesion cells, severe squamous intraepithelial lesion cells, squamous cell carcinoma cells, and other cervical single cells. In some other implementations, the second identification result may include a number N of probabilities of the cell types in the cell cluster with the largest probabilities among the cell types, wherein N is a positive integer, for example but not limited to, 2, 3, 4, or 6.

In some embodiments, the second image identification network is capable of acquiring a three-dimensional structure feature and a plane structure feature of the cell cluster in the images and interpreting an abnormal cell type based on the acquired three-dimensional structure feature and plane structure feature of the cell cluster. The server 304 inputs the acquired multi-layer image blocks of the cell cluster into the second image identification network to obtain the second identification result corresponding to the multi-layer image blocks of the cell cluster.

In an embodiment, that the server 304 inputs the multi-layer image blocks of the cell cluster into the second image identification network to obtain the second identification result corresponding to the multi-layer image blocks of the cell cluster includes: the server 304 selects at least one layer of image blocks from the multi-layer image blocks of the cell cluster, inputs the at least one layer of image blocks into a first part of the second image identification network to obtain a second single-layer identification result corresponding to the multi-layer image blocks of the cell cluster, inputs the multi-layer image blocks of the cell cluster into a second part of the second image identification network to obtain a second multi-layer identification result corresponding to the multi-layer image blocks of the cell cluster, and fuses the second single-layer identification result and the second multi-layer identification result to obtain the second identification result. The first part of the second image identification network is used for extracting plane information of the cell cluster, and the second part of the second image identification network is used for extracting three-dimensional structure information of the cell cluster. In some implementations, the server 304 may select a single layer of image blocks from the multi-layer image blocks of the cell cluster, inputs the single layer of image blocks into a first part of the second image identification network to obtain a second single-layer identification result corresponding to the multi-layer image blocks of the cell cluster; the server 304 may input the multi-layer image blocks of the cell cluster into a second part of the second image identification network to obtain a second multi-layer identification result corresponding to the multi-layer image blocks of the cell cluster, and/or the server 304 may fuse the second single-layer identification result and the second multi-layer identification result to obtain the second identification result.

In an embodiment, that the server 304 fuses the second single-layer identification result and the second multi-layer identification result to obtain the second identification result includes: the server 304 performs weighted averaging on the second single-layer identification result and the second multi-layer identification result for a plurality of abnormal cell types of the cell cluster, to obtain the second identification result. In some implementations, the server 304 performs weighted averaging on the second single-layer identification result and the second multi-layer identification result for a plurality of cell types of the cell cluster, to obtain the second identification result, wherein the cell types of the cell cluster may include normal and abnormal cell types.

In some embodiments, the second image identification network may be in the structure 700 of the two-stream convolutional neural network as shown in FIG. 7. The second image identification network includes a first part (for example, a first branch 701) of the second image identification network and a second part (for example, a second branch 702) of the second image identification network. The first part of the second image identification network is used for extracting the plane information of the cell cluster, and the second part of the second image identification network is used for extracting the three-dimensional structure information of the cell cluster.

In an embodiment, the architecture of the two-stream convolutional neural network may be configured as follows: The first layer is a convolutional layer with a convolution kernel of 7×7×96 (where 7×7 is a size in a spatial dimension, and 96 is a size in a hierarchical dimension), the stride of 2, a pooling kernel of 2×2, and a ReLU function as an activation function, and performs normalization operations. The second layer is a convolutional layer with a convolution kernel of 5×5×256 (where 5×5 is a size in a spatial dimension, and 256 is a size in a hierarchical dimension), the stride of 2, a pooling kernel of 2×2, and a ReLU function as an activation function, and performs normalization operations. In some examples, there is no normalization operation in the second layer, to saving the space of memory. The third layer is a convolutional layer with a convolution kernel of 3×3×512 (where 3×3 is a size in a spatial dimension, and 512 is a size in a hierarchical dimension), the stride of 1, and a ReLU function as an activation function. The fourth layer is a convolutional layer with a convolution kernel of 3×3×512 (where 3×3 is a size in a spatial dimension, and 512 is a size in a hierarchical dimension), the stride of 1, and a ReLU function as an activation function. The fifth layer is a convolutional layer with a convolution kernel of 3×3×512 (where 3×3 is a size in a spatial dimension, and 512 is a size in a hierarchical dimension), the stride of 1, a pooling kernel of 2×2, and a ReLU function as an activation function. The sixth layer is a fully-connected layer with 4096 nodes and a ReLU function as an activation function. The seventh layer is a fully-connected layer with 2048 nodes and a ReLU function as an activation function. The eighth layer is a softmax layer.

In a two-stream convolutional neural network of such an architecture, weight and bias parameters of the network are initialized first. In the related art, there are many methods for implementing parameter initialization, and details are not described herein again. Next, the two-stream convolutional neural network is trained. As understood by a person skilled in the art, the server 304 may separately or jointly train the first part (for example, the first branch 701) of the second image identification network and the second part (for example, the second branch 702) of the second image identification network. The server 304 may train the second image identification network in a supervised training manner by using a second data set. The second data set includes multi-layer images of the cell cluster and labels of cell types (or abnormal cell types) corresponding to the multi-layer images of the cell cluster. The server 304 inputs input data in available data to corresponding branches (for example, the first branch 701 and the second branch 702) of the two-stream convolutional neural network for performing complete calculations and obtaining output data. Let a performance function of the branches of the two-stream convolutional neural network be a square value of a difference between each obtained piece of output data and the corresponding label, and summation is then performed, to determine the most suitable parameter group by searching for a global minimal point of the performance function.

In some embodiments, the server 304 adopts a back-propagation algorithm to search for the global minimal point in the present disclosure. Further, in the process of determining the most suitable parameter group, the server 304 generalizes the two-stream convolutional neural network by using a generalization method, so as to avoid a phenomenon of overfitting of the parameter group of the network. For example, the available data may be classified into three parts: a training set, a validation set, and a test set, where the training set accounts for 70%, the validation set accounts for 15%, and the test set accounts for 15%. The training set is used for calculating a gradient or a Jacobian matrix and determining the update of a network weight at each reverse iteration. The validation set is an indicator. During training, if the error sum of squares of the validation set continues to increase, training is ended. The test set is used for finally testing whether the use effect of the two-stream convolutional neural network satisfies the effect, that is, whether the error sum of squares of the test set is less than a preset threshold.

In a case that the server 304 uses the trained two-stream convolutional neural network, at least one layer of image blocks are selected from the multi-layer image blocks (for example, a single layer of relatively clear image blocks is selected, a single layer with the best quality/clearest image blocks is selected), and the at least one layer of image blocks are inputted into the first part of the second image identification network. In an embodiment, the server 304 selects a layer of image blocks. The layer of image blocks pass through five convolutional layers, are then processed by two fully-connected layers, and finally enter the softmax layer to obtain the second single-layer identification result corresponding to the multi-layer images of the cell cluster. The server 304 inputs the multi-layer image blocks of the cell cluster to the second part of the second image identification network. The multi-layer image blocks of the cell cluster pass through five convolutional layers, are then processed by two fully-connected layers, and finally enter the softmax layer to obtain the second multi-layer identification result corresponding to the cell cluster.

In an embodiment, the server 304 obtains an optical flow map in advance by using the multi-layer image blocks of the cell cluster. Such an optical flow map can represent the three-dimensional structure information of the cell cluster. The optical flow map passes through five convolutional layers, is then processed by two fully-connected layers, and finally enters the softmax layer to obtain the second multi-layer identification result corresponding to the cell cluster. After the second single-layer identification result and the second multi-layer identification result are obtained, the server 304 fuses the second single-layer identification result and the second multi-layer identification result to obtain the second identification result.

In an embodiment, that the server 304 fuses the second single-layer identification result and the second multi-layer identification result for a plurality of cell types (or abnormal cell types) of the cell cluster includes: The server 304 performs weighted averaging on the second single-layer identification result and the second multi-layer identification result. Using HSIL as an example of the abnormal cell type of the cell cluster, the second single-layer identification result is HSIL 0.7, and the second multi-layer identification result is HSIL 0.3, the second identification result is a weighted average of the second single-layer identification result of HSIL 0.7 and the second multi-layer identification result of HSIL 0.3. For example, if weights of the second single-layer identification result and the second multi-layer identification result are both equal to 0.5, a weighted average result is (0.7+0.3)/2=0.5. The server 304 then compares the weighted average result with a preset threshold. For example, if the preset threshold is 0.4, the server determines that the cell property is HSIL.

The weights of the second single-layer identification result and the second multi-layer identification result may not be equal, and the preset threshold is also adjusted according to situations. Similar weighting calculations may be performed for other abnormal types of the cell cluster.

In some embodiments, the second image identification network may be another type of image identification network for processing a three-dimensional vector. First, the image identification network performs feature pre-extraction on original multi-layer images in sequence, generates a plurality of pieces of channel information including optical flow information, combines information of all channels to obtain an initial feature map, and uses prior knowledge of initial features to improve the performance of network initialization. Next, the information of the plurality of (for example, five) channels is inputted into a convolutional layer and a downsampling layer of a lower-layer network for further feature extraction. The convolutional layer and the downsampling layer have different widths and scales to ensure that features of the images of the cell cluster at different scales can be effectively extracted while features of the original multi-layer images are extracted, and make the features of the images of the cell cluster robust to different scales of the cell cluster. Finally, the features extracted from the layers are combined in the fully-connected layer to obtain a feature vector. The feature vector includes both spatial and hierarchical feature information of the multi-layer images. An SGD method is used for training the network in a supervised manner based on a self-constructed multi-layer image dataset, and pathological information of the cell cluster is interpreted.

In an embodiment, the first image identification network and the second image identification network are both image identification networks for processing three-dimensional vectors. The first image identification network and the second image identification network may be the same multi-layer image identification network or different multi-layer image identification networks.

In an embodiment, the first image identification network is trained based on the first data set, and the first data set includes the multi-layer images of the single cell and the labels of cell types (or abnormal cell types) of the multi-layer images of the single cell. the second image identification network is trained based on the second data set, and the second data set includes the multi-layer images of the cell cluster and the labels of cell types (or abnormal cell types) of the multi-layer images of the cell cluster.

In an embodiment, the first identification result indicates an abnormal cell type in the multi-layer image blocks of the single cell, the second identification result indicates an abnormal cell type in the multi-layer image blocks of the cell cluster. The method further includes: The server 304 determines an abnormal cell type in the to-be-detected sample according to the first identification result and the second identification result.

Step 604 and step 605 may be performed concurrently, or step 605 is performed before step 604. FIG. 6 is merely a schematic implementation provided by this embodiment of this application.

Step 606: The server 304 determines whether an abnormal cell exists in the to-be-detected sample according to the first identification result and the second identification result. The first identification result indicates an abnormal cell type in the multi-layer image blocks of the single cell, the second identification result indicates an abnormal cell type in the multi-layer image blocks of the cell cluster. For example, the first identification result indicates the existence of low-grade squamous intraepithelial lesion (LSIL) and HSIL in the single cell, and the second identification result indicates the existence of atypical squamous cells-cannot exclude high-grade squamous intraepithelial lesion (ASCH) in the cell cluster, which is likely to be a high-grade lesion. The server 304 jointly determines whether an abnormal cell exists in the cell smear based on the first identification result and the second identification result. Specifically, the server 304 can determine that the cell smear includes three abnormal cell types: LSIL, HSIL and ASCH by combining and deduplicating the first identification result and the second identification result.

In some implementations, the server 304 may determine whether an abnormal cell exists in the to-be-detected sample by selecting common result from the first identification result and the second identification result. For example, when the first identification result indicates the existence of LSIL and HSIL in the single cell and the second identification result indicates the existence of HSIL and atypical squamous cells leading towards ASCH in the cell cluster, the server 304 may jointly determine that the cell smear certainly includes HSIL.

In some other implementations, the server 304 may determine whether an abnormal cell exists in the to-be-detected sample by combining the first identification result and the second identification result and removing duplicated result. For example, when the first identification result indicates the existence of LSIL and HSIL in the single cell and the second identification result indicates the existence of HSIL and atypical squamous cells leading towards ASCH in the cell cluster, the server 304 may jointly determine that the cell smear includes three abnormal cell types: LSIL, HSIL and ASCH.

In some embodiments, the server 304 determines whether an abnormal cell exists in the to-be-detected sample by displaying the first identification result and the second identification result on a device such as a microscope or a digital slice scanner.

Figure 8:
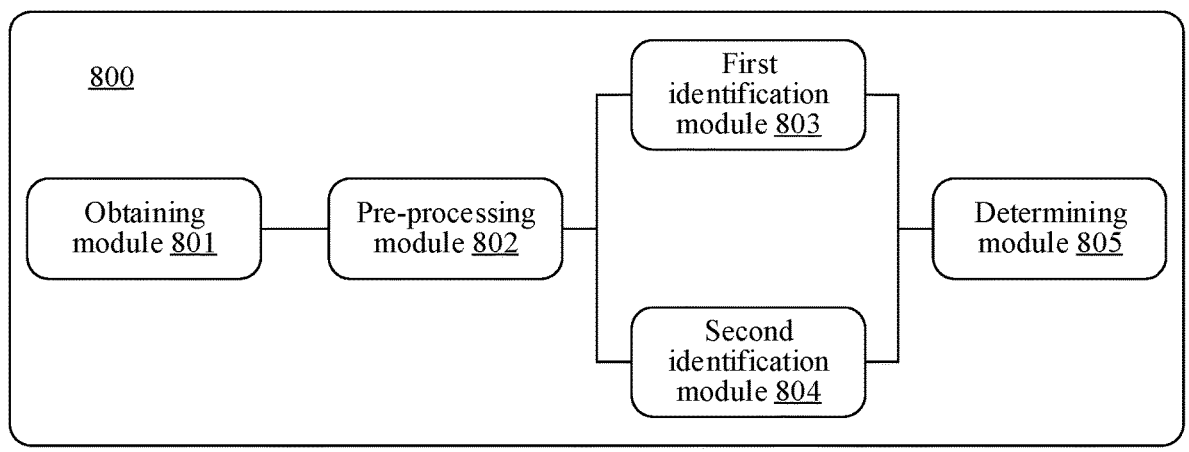
FIG. 8 is a schematic block diagram of a device for identifying an abnormal cell in a to-be-detected sample according to another embodiment of the present disclosure.

FIG. 8 is a schematic block diagram of a device 800 for identifying an abnormal cell in a to-be-detected sample according to another embodiment of the present disclosure. The device 800 includes: an obtaining module 801, a pre-processing module 802, a first identification module 803, a second identification module 804, and a determining module 805.

The obtaining module 801 is configured to obtain multi-layer images of a to-be-detected sample, the to-be-detected sample including a single cell and a cell cluster. The pre-processing module 802 is configured to obtain multi-layer image blocks of the single cell and multi-layer image blocks of the cell cluster according to the multi-layer images. The first identification module 803 is configured to input the multi-layer image blocks of the single cell into a first image identification network to obtain a first identification result. The second identification module 804 is configured to input the multi-layer image blocks of the cell cluster into a second image identification network to obtain a second identification result. The determining module 805 is configured to determine whether an abnormal cell exists in the to-be-detected sample according to the first identification result and the second identification result.

The pre-processing module 802 may further include a division sub-module and a classification sub-module. The division sub-module is configured to divide the multi-layer images into a plurality of multi-layer image blocks, and the classification sub-module is configured to classify the plurality of multi-layer image blocks into a plurality of multi-layer image blocks of the single cell and/or a plurality of multi-layer image blocks of the cell cluster.

Figure 9:
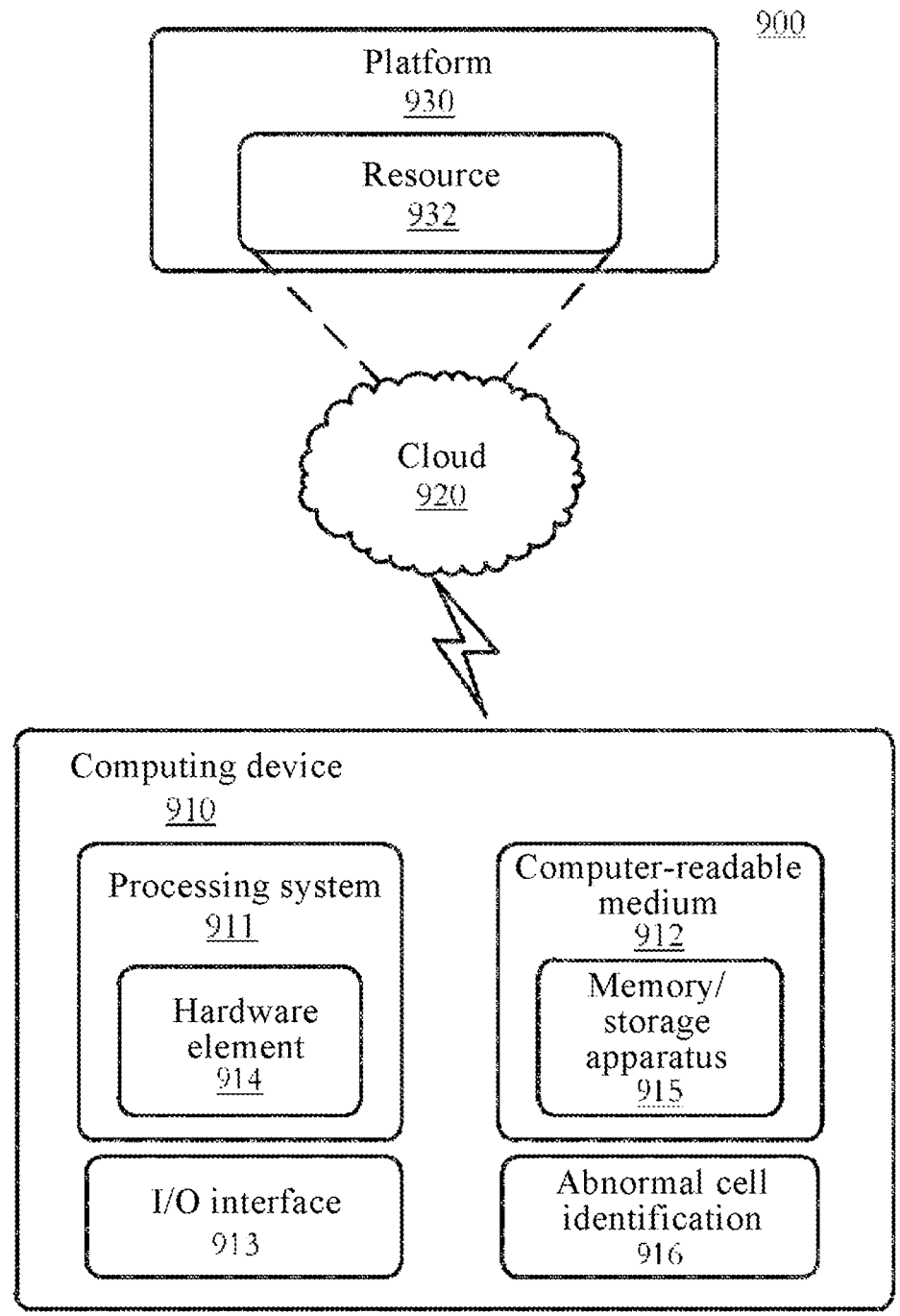
FIG. 9 is a schematic block diagram of a computer device according to an embodiment of the present disclosure.

FIG. 9 schematically shows an exemplary system 900, including an exemplary computing device 910 representing one or more systems and/or devices that may implement various technologies described in this specification.

The computing device 910 may be, for example, a server, a desktop computer, a laptop computer, a tablet, a wearable device (for example, a smartphone, a smart watch, or a smart bracelet), or any other suitable computing device or computing system ranging from a full resource device with a large quantity of memory and processor resources to a low resource device with limited memory and/or processor resources. In some embodiments, the foregoing device 800 for identifying an abnormal cell in a to-be-detected sample with reference to FIG. 8 may in the form of the computing device 910.

As shown in FIG. 9, the exemplary computing device 910 includes a processing system 911, one or more computer-readable media 912, and one or more input/output (I/O) interfaces 913 that are communicatively coupled to each other. Although not shown in FIG. 9, the computing device 910 may further include a bus or another data and command transfer system, which couples various components to each other. The bus may include any one or a combination of different bus structures. The bus structure may be a memory bus or memory controller, a peripheral bus, a universal serial bus, and/or a processor or local bus using any one of various bus architectures. The bus further includes various other examples such as control and data lines.

The processing system 911 represents a function to perform one or more operations by using hardware. Therefore, the processing system 911 is shown to include a hardware element 914 that can be configured as a processor, a functional block, and the like. This may include being implemented in hardware as an application-specific integrated circuit or another logic device formed by using one or more semiconductors. The hardware element 914 is not limited by a material from which the hardware element is formed or a processing mechanism used therein. For example, the processor may be composed of semiconductor(s) and/or transistors (for example, electronic ICs). In such context, processor-executable instructions may be electronically executable instructions.

The computer-readable medium 912 shown in FIG. 9 includes a memory/storage apparatus 915. The memory/storage apparatus 915 represents a memory/storage capacity associated with one or more computer-readable media. The memory/storage apparatus 915 may include volatile media (such as a random access memory (RAM)) and/or nonvolatile media (such as a read only memory (ROM), Flash memory, optical discs, magnetic disks, and so forth). The memory/storage apparatus 915 may include a fixed medium (such as a RAM, a ROM, and a fixed hard disk drive) and a removable medium (such as a flash memory, a removable hard disk drive, and an optical disc). For example, the memory/storage apparatus 915 may include the multi-layer images of the to-be-detected sample, the first data set, the second data set, or the like. The computer-readable medium 912 may be configured in various other manners further described below.

The one or more I/O interfaces 913 represent functions that allow the user to use various input devices to enter commands and information into the computing device 910 and also allow the user to use various output devices to be used to display information to the user and/or transmit the information to other components or devices. Examples of input devices include a keyboard, a cursor control device (e.g., a mouse), a microphone (for example, used for voice input), a scanner, touch functionality (e.g., capacitive or other sensors that are configured to detect physical touch), a camera (e.g., which may employ visible or non-visible wavelengths such as infrared frequencies to recognize movements that do not involve touch as gestures), a network card, a receiver, and so forth. Examples of output devices include a display device (e.g., a monitor or projector), a speaker, a printer, a tactile-response device, a network card, a transmitter, and so forth.

The computing device 910 further includes abnormal cell identification module 916. The abnormal cell identification module 916 may be stored in the memory/storage apparatus 915 as computer program instructions. The abnormal cell identification module 916 may implement all functions of the modules of the device 800 for identifying an abnormal cell in a to-be-detected sample with reference to FIG. 8 together with the processing system 911.

Various technologies may be described herein in a general context of software, hardware elements or program modules. Generally, the modules include a routine, a program, an object, an element, a component, a data structure, and the like for executing a particular task or implementing a particular abstract data type. The terms "module", "functionality", and "component" as used herein generally represent software, firmware, hardware, or a combination thereof. The features of the technologies described herein are platform-independent, which means that the technologies may be implemented on various computing platforms with various processors.

Implementations of the described modules and technologies may be stored on or transmitted across some form of computer-readable media. The computer-readable medium may include various media that can be accessed by the computing device 910. By way of example, and not limitation, the computer-readable medium may include a "computer-readable storage medium" and a "computer-readable signal medium".

Contrary to pure signal transmission, a carrier or a signal, the "computer-readable storage medium" is a medium and/or a device that can persistently store information, and/or a tangible storage apparatus. Therefore, the computer-readable storage medium is a non-signal bearing medium. The computer-readable storage medium is hardware such as a storage device implemented by methods or technologies including volatile and nonvolatile, removable and non-removable media and/or suitable for storing information (for example, computer-readable instructions, data structures, program modules, logic elements/circuits, or other data). Examples of computer-readable storage media may include, but are not limited to, RAM, ROM, EEPROM, flash memory or other memory technology, CD-ROM, digital versatile disk (DVD) or other optical storage, hard disks, magnetic cassettes, magnetic tape, magnetic disk storage or other magnetic storage devices, or other storage device, tangible media, or article of manufacture that is suitable to store the desired information and which may be accessed by a computer.

The "computer-readable signal medium" is a signal bearing medium configured to send an instruction to hardware of the computing device 910, for example, by using a network. Signal media typically may embody computer-readable instructions, data structures, program modules, or other data in a modulated data signal, such as a carrier wave, a data signal, or another transport mechanism. Signal media further include any information delivery media. The term "modulated data signal" may include such a signal: One or more features of the signal are set or changed (in this way) to encode information into the signal. By way of example, and not limitation, communication media include wired media such as a wired network or direct-wired connection, and wireless media such as acoustic, RF, infrared, and other wireless media.

As described above, the hardware element 914 and the computer-readable medium 912 represent an instruction, a module, a programmable device logic and/or a fixed device logic that are implemented in the form of hardware, which may be used, in some embodiments, for implementing at least some aspects of the technologies described herein. Hardware elements may include components of an integrated circuit or system-on-chip, an application-specific integrated circuit (ASIC), a field-programmable gate array (FPGA), a complex programmable logic device (CPLD), and other implementations in silicon or other hardware devices. In such a context, the hardware element may be used as a processing device for executing a program task defined by an instruction, a module, and/or a logic embodied by the hardware element, as well as a hardware device for storing an instruction for execution, such as the computer-readable storage medium described above.

The foregoing combinations may also be used to implement the techniques and modules described herein. Accordingly, software, hardware or program modules, and other program modules may be implemented as one or more instructions and/or logic embodied on some form of computer-readable storage media and/or by one or more hardware elements 914. The computing device 910 may be configured to implement a specific instruction and/or function corresponding to a software and/or hardware module. Therefore, for example, by using the computer-readable storage medium and/or the hardware element 914 of the processing system, the module can be implemented, at least partially in hardware, as a module that can be executed as a software by the computing device 910. The instruction and/or function may be executable/operable by one or more articles of manufacture (such as one or more computing devices 910 and/or processing systems 911) to implement the technologies, modules, and examples described herein.

The technologies described herein may be supported by the various configurations of the computing device 910, and are not limited to specific examples of the technologies described herein. The functions of the computing device 910 may also be implemented all or in part through use of a distributed system, such as over a "cloud" 920 via a platform 930 as described below.

The cloud 920 includes and/or represents the platform 930 for a resource 932. The platform 930 abstracts underlying functionality of hardware (e.g., servers) and software resources of the cloud 920. The resources 932 may include an application and/or data that may be used when computer processing is performed on a server remote from the computing device 910. The resources 932 can also include services provided over the Internet and/or through a client network, such as a cellular or Wi-Fi network.

The platform 930 can abstract the resource and the function to connect the computing device 910 to another computing device. The platform 930 may also be used for abstracting scaling of resources to provide a corresponding level of scale to encountered demand for the encountered resource 932 implemented through the platform 930. Therefore, in an interconnection device embodiment, the implementation of the functions described herein may be distributed throughout the system 900. For example, the function may be partially implemented on the computing device 910 and through the platform 930 that abstracts the function of the cloud 920.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

The present disclosure further provides a computer program product is provided, including instructions, the instructions, when run on a computer, causing the computer to perform the method for identifying an abnormal cell in a to-be-detected sample according to any one of the foregoing embodiments.

As understood by a person skilled in the art, the term "cell" of the present disclosure is not limited to a cervical cell, but also includes any other cell that can be identified by using this method, including but not limited to cell tissue such as a laryngeal cell, a rectum cell, a hypopharyngeal cell, or a nasopharyngeal cell, and other cell tissue that can be identified by using a cell smear.

By studying the accompanying drawings, the disclosure, and the appended claims, a person skilled in the art can understand and implement variations of the disclosed embodiments when practicing the claimed subject matter. In the claims, the term "comprise" does not exclude other elements or steps, and the terms "a/an" or "one" does not exclude a plurality. The mere fact that some features are recorded in mutually different dependent claims does not indicate that the combination of the features cannot be used or implemented.

What is claimed is:

1. A method for identifying an abnormal cell in a to-be-detected sample, the method comprising:
    obtaining, by a device comprising a memory storing instructions and a processor in communication with the memory, multi-layer images of a to-be-detected sample, the to-be-detected sample comprising a single cell and a cell cluster;
    obtaining, by the device, multi-layer image blocks of the single cell and multi-layer image blocks of the cell cluster according to the multi-layer images;
    obtaining, by the device, a first identification result by a first image identification network according to the multi-layer image blocks of the single cell;
    obtaining, by the device, a second identification result by a second image identification network according to the multi-layer image blocks of the cell cluster, including:
        selecting at least one layer of image blocks from the multi-layer image blocks of the cell cluster, and inputting the at least one layer of image blocks into a first part of the second image identification network to obtain a second single-layer identification result corresponding to the multi-layer image blocks of the cell cluster; and
        inputting the multi-layer image blocks of the cell cluster into a second part of the second image identification network to obtain a second multi-layer identification result corresponding to the multi-layer image blocks of the cell cluster; and
    determining, by the device, whether an abnormal cell exists in the to-be-detected sample according to the first identification result and the second identification result.

2. The method according to claim 1, wherein the obtaining the multi-layer image blocks of the single cell and the multi-layer image blocks of the cell cluster according to the multi-layer images comprises:
    dividing the multi-layer images into a plurality of multi-layer image blocks; and
    classifying the plurality of multi-layer image blocks into the multi-layer image blocks of the single cell and the multi-layer image blocks of the cell cluster.

3. The method according to claim 2, wherein the classifying the plurality of multi-layer image blocks into the multi-layer image blocks of the single cell and the multi-layer image blocks of the cell cluster comprises:

performing the classification by determining a quantity of cell nuclei in each of the plurality of multi-layer image blocks.

4. The method according to claim 1, wherein the obtaining the first identification result by the first image identification network according to the multi-layer image blocks of the single cell comprises:
selecting at least one layer of image blocks from the multi-layer image blocks of the single cell, and inputting the at least one layer of image blocks into a first part of the first image identification network to obtain a first single-layer identification result corresponding to the multi-layer image blocks of the single cell;
inputting the multi-layer image blocks of the single cell into a second part of the first image identification network to obtain a first multi-layer identification result corresponding to the multi-layer image blocks of the single cell; and
fusing the first single-layer identification result and the first multi-layer identification result to obtain the first identification result, wherein:
the first part of the first image identification network is used for extracting plane information of the single cell, and the second part of the first image identification network is used for extracting three-dimensional structure information of the single cell.

5. The method according to claim 4, wherein the fusing the first single-layer identification result and the first multi-layer identification result to obtain the first identification result comprises:
performing weighted averaging on the first single-layer identification result and the first multi-layer identification result for a plurality of cell types of the single cell, to obtain the first identification result.

6. The method according to claim 1, wherein the obtaining the second identification result by the second image identification network according to the multi-layer image blocks of the cell cluster further comprises:
fusing the second single-layer identification result and the second multi-layer identification result to obtain the second identification result, wherein:
the first part of the second image identification network is used for extracting plane information of the cell cluster, and the second part of the second image identification network is used for extracting three-dimensional structure information of the cell cluster.

7. The method according to claim 1, wherein:
the first image identification network is trained based on a first data set, and the first data set comprises multi-layer images of the single cell and labels of cell types of the multi-layer images of the single cell; and
the second image identification network is trained based on a second data set, and the second data set comprises multi-layer images of the cell cluster and labels of cell types of the multi-layer images of the cell cluster.

8. An apparatus for identifying an abnormal cell in a to-be-detected sample, the apparatus comprising:
a memory storing instructions; and
a processor in communication with the memory, wherein, when the processor executes the instructions, the processor is configured to cause the apparatus to perform:
obtaining multi-layer images of a to-be-detected sample, the to-be-detected sample comprising a single cell and a cell cluster,
obtaining multi-layer image blocks of the single cell and multi-layer image blocks of the cell cluster according to the multi-layer images,
obtaining a first identification result by a first image identification network according to the multi-layer image blocks of the single cell,
obtaining a second identification result by a second image identification network according to the multi-layer image blocks of the cell cluster, including:
selecting at least one layer of image blocks from the multi-layer image blocks of the cell cluster, and inputting the at least one layer of image blocks into a first part of the second image identification network to obtain a second single-layer identification result corresponding to the multi-layer image blocks of the cell cluster; and
inputting the multi-layer image blocks of the cell cluster into a second part of the second image identification network to obtain a second multi-layer identification result corresponding to the multi-layer image blocks of the cell cluster, and
determining whether an abnormal cell exists in the to-be-detected sample according to the first identification result and the second identification result.

9. The apparatus according to claim 8, wherein the obtaining the multi-layer image blocks of the single cell and the multi-layer image blocks of the cell cluster according to the multi-layer images comprises:
dividing the multi-layer images into a plurality of multi-layer image blocks; and
classifying the plurality of multi-layer image blocks into the multi-layer image blocks of the single cell and the multi-layer image blocks of the cell cluster.

10. The apparatus according to claim 9, wherein the classifying the plurality of multi-layer image blocks into the multi-layer image blocks of the single cell and the multi-layer image blocks of the cell cluster comprises:
performing the classification by determining a quantity of cell nuclei in each of the plurality of multi-layer image blocks.

11. The apparatus according to claim 8, wherein the obtaining the first identification result by the first image identification network according to the multi-layer image blocks of the single cell comprises:
selecting at least one layer of image blocks from the multi-layer image blocks of the single cell, and inputting the at least one layer of image blocks into a first part of the first image identification network to obtain a first single-layer identification result corresponding to the multi-layer image blocks of the single cell;
inputting the multi-layer image blocks of the single cell into a second part of the first image identification network to obtain a first multi-layer identification result corresponding to the multi-layer image blocks of the single cell; and
fusing the first single-layer identification result and the first multi-layer identification result to obtain the first identification result, wherein:
the first part of the first image identification network is used for extracting plane information of the single cell, and the second part of the first image identification network is used for extracting three-dimensional structure information of the single cell.

12. The apparatus according to claim 11, wherein the fusing the first single-layer identification result and the first multi-layer identification result to obtain the first identification result comprises:
performing weighted averaging on the first single-layer identification result and the first multi-layer identification result for a plurality of cell types of the single cell, to obtain the first identification result.

13. The apparatus according to claim 8, wherein the obtaining the second identification result by the second image identification network according to the multi-layer image blocks of the cell cluster further comprises:
   fusing the second single-layer identification result and the second multi-layer identification result to obtain the second identification result, wherein:
      the first part of the second image identification network is used for extracting plane information of the cell cluster, and the second part of the second image identification network is used for extracting three-dimensional structure information of the cell cluster.

14. The apparatus according to claim 8, wherein:
   the first image identification network is trained based on a first data set, and the first data set comprises multi-layer images of the single cell and labels of cell types of the multi-layer images of the single cell; and
   the second image identification network is trained based on a second data set, and the second data set comprises multi-layer images of the cell cluster and labels of cell types of the multi-layer images of the cell cluster.

15. A non-transitory computer-readable storage medium, storing computer-readable instructions, wherein, the computer-readable instructions, when executed by a processor, are configured to cause the processor to perform:
   obtaining multi-layer images of a to-be-detected sample, the to-be-detected sample comprising a single cell and a cell cluster;
   obtaining multi-layer image blocks of the single cell and multi-layer image blocks of the cell cluster according to the multi-layer images;
   obtaining a first identification result by a first image identification network according to the multi-layer image blocks of the single cell;
   obtaining a second identification result by a second image identification network according to the multi-layer image blocks of the cell cluster, including:
      selecting at least one layer of image blocks from the multi-layer image blocks of the cell cluster, and inputting the at least one layer of image blocks into a first part of the second image identification network to obtain a second single-layer identification result corresponding to the multi-layer image blocks of the cell cluster; and
      inputting the multi-layer image blocks of the cell cluster into a second part of the second image identification network to obtain a second multi-layer identification result corresponding to the multi-layer image blocks of the cell cluster; and
   determining whether an abnormal cell exists in the to-be-detected sample according to the first identification result and the second identification result.

16. The non-transitory computer-readable storage medium according to claim 15, wherein the obtaining the multi-layer image blocks of the single cell and the multi-layer image blocks of the cell cluster according to the multi-layer images comprises:

dividing the multi-layer images into a plurality of multi-layer image blocks; and
classifying the plurality of multi-layer image blocks into the multi-layer image blocks of the single cell and the multi-layer image blocks of the cell cluster.

17. The non-transitory computer-readable storage medium according to claim 16, wherein the classifying the plurality of multi-layer image blocks into the multi-layer image blocks of the single cell and the multi-layer image blocks of the cell cluster comprises:
   performing the classification by determining a quantity of cell nuclei in each of the plurality of multi-layer image blocks.

18. The non-transitory computer-readable storage medium according to claim 15, wherein the obtaining the first identification result by the first image identification network according to the multi-layer image blocks of the single cell comprises:
   selecting at least one layer of image blocks from the multi-layer image blocks of the single cell, and inputting the at least one layer of image blocks into a first part of the first image identification network to obtain a first single-layer identification result corresponding to the multi-layer image blocks of the single cell;
   inputting the multi-layer image blocks of the single cell into a second part of the first image identification network to obtain a first multi-layer identification result corresponding to the multi-layer image blocks of the single cell; and
   fusing the first single-layer identification result and the first multi-layer identification result to obtain the first identification result, wherein:
      the first part of the first image identification network is used for extracting plane information of the single cell, and the second part of the first image identification network is used for extracting three-dimensional structure information of the single cell.

19. The non-transitory computer-readable storage medium according to claim 18, wherein the fusing the first single-layer identification result and the first multi-layer identification result to obtain the first identification result comprises:
   performing weighted averaging on the first single-layer identification result and the first multi-layer identification result for a plurality of cell types of the single cell, to obtain the first identification result.

20. The non-transitory computer-readable storage medium according to claim 15, wherein the obtaining the second identification result by the second image identification network according to the multi-layer image blocks of the cell cluster further comprises:
   fusing the second single-layer identification result and the second multi-layer identification result to obtain the second identification result, wherein:
      the first part of the second image identification network is used for extracting plane information of the cell cluster, and the second part of the second image identification network is used for extracting three-dimensional structure information of the cell cluster.

* * * * *